United States Patent
Andreis et al.

(10) Patent No.: US 10,519,830 B2
(45) Date of Patent: Dec. 31, 2019

(54) METHOD FOR ADJUSTING THE PRESSURE IN A PUMPING SYSTEM

(71) Applicant: FLUID-O-TECH S.R.L., Corsico (MI) (IT)

(72) Inventors: Diego Andreis, Milan (IT); Francesco Tirelli, Arese (IT)

(73) Assignee: FLUID-O-TECH S.R.L., Corsico (MI) (IT)

(*) Notice: Subject to any disclaimer, the term of this patent is extended or adjusted under 35 U.S.C. 154(b) by 31 days.

(21) Appl. No.: 15/886,227

(22) Filed: Feb. 1, 2018

(65) Prior Publication Data
US 2018/0223713 A1 Aug. 9, 2018

(30) Foreign Application Priority Data
Feb. 3, 2017 (IT) .......................... 102017000012147

(51) Int. Cl.
*F01N 3/18* (2006.01)
*F01N 13/00* (2010.01)
*F01N 3/28* (2006.01)
*F01N 13/10* (2010.01)

(52) U.S. Cl.
CPC ............... *F01N 3/18* (2013.01); *F01N 3/28* (2013.01); *F01N 13/009* (2014.06); *F01N 13/10* (2013.01)

(58) Field of Classification Search
CPC combination set(s) only.
See application file for complete search history.

(56) References Cited

U.S. PATENT DOCUMENTS

| 6,882,929 B2* | 4/2005 | Liang ...................... F01N 3/208 |
| | | 123/295 |
| 9,518,499 B2* | 12/2016 | Dylhoff ................. F01N 11/002 |
| 9,528,417 B1* | 12/2016 | Tuken ..................... F01N 3/208 |
| 9,677,444 B2* | 6/2017 | Dea ......................... F01N 3/208 |
| 10,018,096 B2* | 7/2018 | Wallimann ............ F04B 49/065 |
| 2009/0113877 A1* | 5/2009 | Van Nieuwstadt ... F01N 3/2066 |
| | | 60/286 |
| 2016/0090887 A1* | 3/2016 | Mitchell ................ F01N 3/208 |
| | | 60/274 |

FOREIGN PATENT DOCUMENTS

| DE | 102011088704 | 6/2013 |
| GB | 2454348 | 5/2009 |
| GB | 2505224 | 2/2014 |

* cited by examiner

*Primary Examiner* — Binh Q Tran
(74) *Attorney, Agent, or Firm* — King & Schickli, PLLC

(57) ABSTRACT

The invention describes a method for adjusting the pressure in a pumping system (10) of a motor vehicle with an internal combustion engine. The pumping system (10) comprises one or more pumps, wherein each pump is provided with a respective driving motor, and at least one programmable electronic control unit (12). The method comprises the steps of adjusting or mapping the programmable electronic control unit (12) of the pumping system (10), carried out by setting a set of predefined operating parameters of each pump in the programmable electronic control unit (12) of the pumping system (10), and of controlling the operation of the pumping system (10), wherein such control is an open-loop control and wherein the control action is independent from the values of the output parameters of the pumping system (10).

8 Claims, 1 Drawing Sheet

METHOD FOR ADJUSTING THE PRESSURE IN A PUMPING SYSTEM

TECHNICAL FIELD

The present invention refers to a method for adjusting the pressure in a pumping system, in particular but not exclusively a pumping system used in a motor vehicle with an internal combustion engine and provided with a selective catalytic reduction device (SCR).

BACKGROUND

As known, selective catalytic reduction is a chemical process for reducing nitrogen oxides and mixtures thereof in the exhaust gases of internal combustion engines. In a selective catalytic reduction device, commonly called catalytic converter, a reducing chemical agent in liquid or gas state (in general ammonia or urea) is added to the exhaust gases. The reducer has the strong tendency to absorb oxygen, thus limiting the formation of nitrogen oxides inside the exhaust gas and forming $H_2O$ (steam) and $N_2$ (nitrogen gas).

Currently, in SCR catalytic converters of motor vehicles a closed-loop Proportional-Integral-Derivative controller, commonly abbreviated as PID controller or regulator, is commonly used to maintain the pressure of the chemical agent within a predefined range of values. This allows the best operation both of the SCR catalyst, in particular in terms of the injection step of the chemical agent, and of the internal combustion engine.

In the SCR catalyst of a motor vehicle with an internal combustion engine the feeding unit of the chemical agent generally consists of a feeding pump provided with a filter. Using a PID controller, the speed of the driving motor of the feeding pump of the chemical agent is subordinated to a signal indicative of the instantaneous pressure value of such a chemical agent, which is continuously controlled and compared with the target value.

A generic PID controller acquires an input value from a process and compares it with a reference value. The difference between these two values, consisting of the so-called error signal, is thus used to determine the value of the output variable of the controller, which is the manipulable variable of the process. FIG. 1 shows a block diagram that illustrates the operation of a generic PID controller, in which:
  r(t)=reference value;
  e(t)=error signal;
  u(t)=output variable of the controller;
  d(t)=additive output disturbance of the controller;
  y(t)=value to be controlled;
  n(t)=measurement noise.

In a PID controller the output variable u(t) is generated based on the contribution of three terms. The first term is proportional to the error signal e(t) between the reference value r(t) and the value to be controlled y(t). The second term is proportional to the integral of the error signal e(t), thus depending on the average value of the error signal e(t). The third term is, on the other hand, proportional to the derivative of the error signal e(t), thus being affected by the speed of variation of the error signal e(t). The control law of the PID controller can therefore be written as follows:

$$u(t) = K_P e(t) + K_I \int_0^t e(\tau)d\tau + K_D \frac{de(t)}{dt}$$

where:
  $K_P$=proportional gain;
  $K_I$=integral gain;
  $K_D$=derivative gain.

A motor vehicle with SCR catalyst must therefore be provided with a pressure sensor and with a PID controller on-board its electronic control station to allow the motor of the feeding pump of the chemical agent to close the pressure control loop of such a chemical agent. As mentioned previously, indeed, the speed of the driving motor of the feeding pump of the chemical agent is subordinate to a signal indicative of the instantaneous pressure value of such a chemical agent.

All of the external and disturbance factors, like for example temperature variation, viscosity and density values of the chemical agent, different internal tolerances of the pump, wearing of the pump, etc., are compensated by simply suitably adjusting the speed of the driving motor of the pump following the operative logic of a "black box" model. In the theory of systems, a "black box" model is a system essentially describable by its external behaviour, in other words only by how it reacts in output on the basis of a certain input stress, but the internal operation of which is not visible or is unknown.

Consequently, as known from the theory of controls and as shown in FIG. 2, a generic closed-loop PID controller carries out a feedback cycle that brings back, at the input of the process that it is wished to control, a function of the output that is added algebraically to the signal already present in input. For this reason, the closed-loop controllers are also called feedback controllers.

SUMMARY

The purpose of the present invention is therefore to make a method for adjusting the pressure in a pumping system that comprises an open-loop control, in which the control action is independent from the output variables from the process that it is wished to control.

Another purpose of the present invention is to make a method for adjusting the pressure in a pumping system that does not require the presence of a pressure sensor, thus adjusting the speed of the driving motor of the pump based on a series of predefined and preset parameters.

These purposes according to the present invention are accomplished by making a method for adjusting the pressure in a pumping system as outlined in claim 1.

Further characteristics of the invention are highlighted by the dependent claims, which are an integral part of the present description.

BRIEF DESCRIPTION OF THE DRAWING FIGURES

The characteristics and advantages of a method for adjusting the pressure in a pumping system according to the present invention will become clearer from the following description, given as an example and not for limiting purposes, referring to the attached schematic drawings, in which.

DETAILED DESCRIPTION

Figure 1:
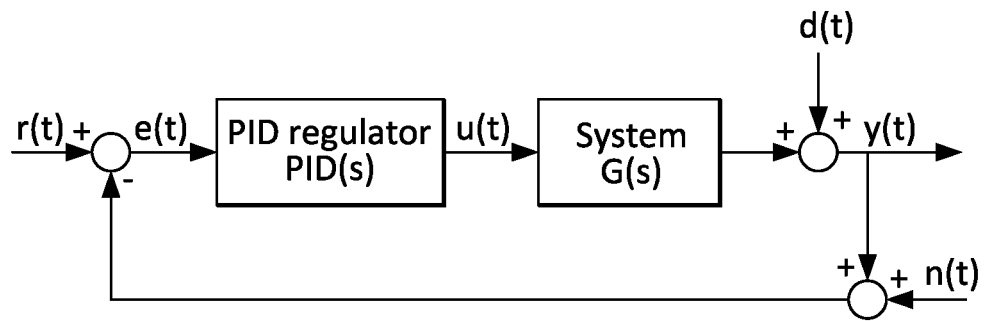
FIG. 1 is a block diagram that illustrates the operating logic of a generic PID (Proportional-Integral-Derivative) controller.
Figure 2:
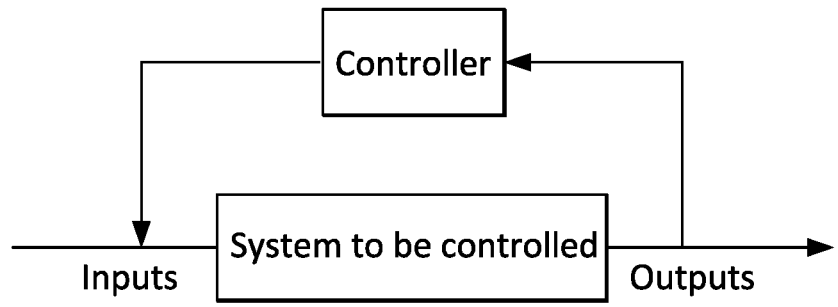
FIG. 2 is a block diagram that illustrates the operating logic of a generic closed-loop PID controller.
Figure 3:
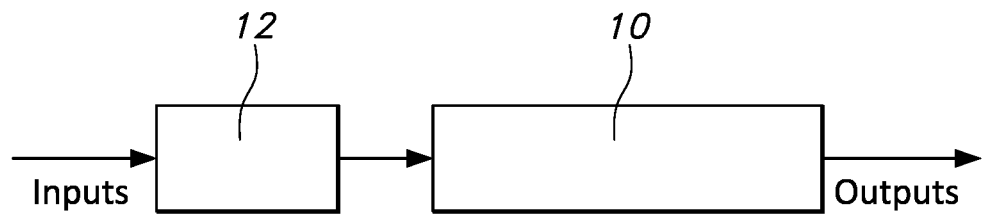
FIG. 3 is a block diagram that illustrates the operating logic of an open-loop controller associable with a method for adjusting the pressure in a pumping system according to the present invention.

With reference in particular to FIG. 3, a method for adjusting the pressure in a pumping system according to the present invention is shown. The pumping system can be used in particular but not exclusively as a feeding unit of the reducing chemical agent in a motor vehicle with an internal combustion engine, provided with a selective catalytic reduction device (SCR).

Advantageously, therefore, the pumping system can be a pumping system of a selective catalytic reduction device with which the motor vehicle with an internal combustion engine is provided.

The pumping system comprises at least one pumping circuit for at least one fluid, typically consisting of the reducing chemical agent of the selective catalytic reduction device. The pumping system can consist of one or more pumps of any type, typically positive displacement pumps. Each pump is provided with a respective driving motor, typically consisting of an electric motor.

The pumping system is provided with at least one programmable electronic control unit. In FIG. 3 the pumping system is schematised with reference numeral 10, whereas the programmable electronic control unit is schematised with reference numeral 12.

The method for adjusting the pressure comprises a first step of adjusting (mapping) the programmable electronic control unit 12 of the pumping system 10, to be carried out on the assembling line of the pumping system 10 itself. This adjustment (mapping) step is carried out by setting a set of predefined operating parameters of each pump in the programmable electronic control unit 12 of the pumping system 10.

The method for adjusting the pressure thus comprises a second step of controlling the operation of the pumping system 10, wherein such control is an open-loop control. In an open-loop control the control action is independent from the values of the output parameters from the pumping system 10. In order for the control step to be reliable, it is suitable to preliminarily process a suitable mathematical model capable of simulating the operation of the pumping system 10 in a sufficiently precise manner.

The set of predefined operating parameters of each pump of the pumping system 10 can consist, preferably but not exclusively, of one or more of the following parameters:
- nominal rotation speed (rpm) of the driving motor of each pump of the pumping system 10 in order to achieve the pressure (in mbar) required by the pumping system 10 at room temperature (in ° C.);
- pressure pulsation law based on the pressure (in mbar) and the flow rate of the fluid (in l/h) processed by the pumping system 10;
- flow rate-speed law (in l/h/rpm);
- torque-pressure law (in mNm/mBar);
- speed-temperature law (in rpm/° C.);
- average wear effect over time law (in rpm/h) of the pumping system 10;
- correlation of the fluids (water-chemical agent) processed by the pumping system 10;
- combination of the parameters when the sum of the effects is non-linear.

This set of parameters concerns exclusively the pumping system 10 and is therefore independent from the operating conditions of the selective catalytic reduction device and, more generally, of the motor vehicle.

The control channel of the rotation speed of the driving motor of each pump of the pumping system 10 is controlled by the programmable electronic control unit 12 as a function of a theoretical speed value, calculated using the set of predefined operating parameters stored in such a programmable electronic control unit 12.

The pulsation level of each pump of the pumping system 10 can be estimated from the pulsation data detected in the testing phase of the pumping system 10 itself.

The method for adjusting the pressure can also comprise a step of measuring the current absorbed by the driving motor of each pump of the pumping system 10. The measured current value can be used as indirect measure of the pressure level in the pumping circuit.

The parameters relative to the temperature values can be read through one or more temperature sensors. For example, the temperature sensor normally present on the selective catalytic reduction device can be used.

Advantageously, the set of predefined operating parameters of each pump of the pumping system 10 comprises at least the parameter of nominal rotation speed of the driving motor of each pump of the pumping system 10 in order to achieve the pressure required by the pumping system 10 at room temperature.

Indeed, the possibility of preliminarily knowing at least the pressure generated by the pumping system 10 as a function of the nominal rotation speed of the driving motor of each pump of the pumping system, so-called "pressure-speed law", makes it possible to control the operation of the pumping system in an open loop, i.e. without using pressure sensors.

The use of a combination of further parameters among those defined above, like for example the "average wear effect over time law of the pumping system", in addition to the aforementioned "pressure-speed law" advantageously makes it possible to control the operation of the pumping system in an even more accurate manner.

It has thus been seen that the method for adjusting the pressure in a pumping system according to the present invention achieves the purposes highlighted earlier. The method for adjusting the pressure in a pumping system according to the present invention makes it possible to drive such a pumping system in an open loop, without the need for pressure feedback in the selective catalytic reduction device or SCR circuit. In addition, the method for adjusting the pressure in a pumping system according to the present invention, ensuring a defined pressure that is as constant as possible in all of the work conditions of the selective catalytic reduction device, ensures an adequate injection performance of the chemical agent, with a simpler architecture and a smaller number of components.

The method for adjusting the pressure in a pumping system of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. Method for adjusting the pressure in a pumping system (10) of a motor vehicle with an internal combustion engine, the pumping system (10) comprising:
   at least one pumping circuit for at least one fluid;
   one or more pumps, wherein each pump is provided with a respective driving motor;
   at least one programmable electronic control unit (12);
   the method comprising:
   adjusting or mapping the at least one programmable electronic control unit (12) of the pumping system (10), carried out by setting a set of predefined operating parameters of said one or more pumps in the at least one programmable electronic control unit (12) of the pumping system (10) wherein said set of predefined operating parameters includes at least a nominal rotation speed of the driving motor of each pump of the pumping system (10) in order to achieve a pressure required by said pumping system (10) at room temperature;
   controlling the operation of the pumping system (10) using an open-loop control independent of output parameter values of the pumping system (10).

2. Method according to claim 1, wherein the set of predefined operating parameters of said one or more pumps of the pumping system (10) further includes one or more of the following parameters:
   pressure pulsation law based on the pressure and flow rate of the fluid processed by the pumping system (10);
   flow rate-speed law;
   torque-pressure law;
   speed-temperature law;
   average wear effect over time law of the pumping system (10);
   correlation of the fluids (water-chemical agent) processed by the pumping system (10);
   combination of the parameters when the sum of the effects is non-linear.

3. Method according to claim 1, comprising simulating operation of the pumping system using a mathematical model.

4. Method according to claim 1, wherein the step of adjusting or mapping the at least one programmable electronic control unit (12) of the pumping system (10) is carried out on an assembling line of the pumping system (10).

5. Method according to claim 1, comprising a step of controlling, through the at least one programmable electronic control unit (12), a control channel of the rotation speed of the driving motor of each pump of the pumping system (10), wherein said control step is carried out as a function of a theoretical speed value calculated using the set of predefined operating parameters of said one or more pumps stored in said at least one programmable electronic control unit (12).

6. Method according to claim 1, comprising a step of estimating a pulsation level of each pump of the pumping system (10), wherein said estimation step is carried out from pulsation data detected during an assembling line testing phase of said pumping system (10).

7. Method according to claim 1, comprising a step of measuring the current absorbed by the driving motor of each pump of the pumping system (10), wherein the measured current value is used as an indirect measure of a pressure level in the pumping circuit.

8. Method according to claim 1, wherein said pumping system (10) is a pumping system of a selective catalytic reduction device with which said motor vehicle is provided.

* * * * *